US005482637A

United States Patent [19]
Rao et al.

[11] Patent Number: 5,482,637
[45] Date of Patent: *Jan. 9, 1996

[54] ANTI-FRICTION COATING COMPOSITION CONTAINING SOLID LUBRICANTS

[75] Inventors: V. Durga N. Rao, Bloomfield Township; Daniel M. Kabat, Oxford; Brian W. Lizotte, Plymouth, all of Mich.

[73] Assignee: Ford Motor Company, Dearborn, Mich.

[ * ] Notice: The term of this patent shall not extend beyond the expiration date of Pat. No. 5,363,821.

[21] Appl. No.: 298,640

[22] Filed: Aug. 31, 1994

Related U.S. Application Data

[63] Continuation-in-part of Ser. No. 88,686, Jul. 6, 1993, Pat. No. 5,363,821.
[51] Int. Cl.$^6$ ................................................. C10M 125/00
[52] U.S. Cl. ................................. 252/29; 252/25; 252/12
[58] Field of Search ............................................ 252/25, 29

[56] References Cited

U.S. PATENT DOCUMENTS

| | | | |
|---|---|---|---|
| 1,654,509 | 12/1927 | Claus | 29/898.1 |
| 3,659,861 | 5/1972 | Rao et al. | 277/96 |
| 3,930,071 | 12/1975 | Rao et al. | 427/203 |
| 4,715,972 | 12/1987 | Pacholke | 252/29 |
| 4,872,432 | 10/1989 | Rao et al. | 123/193 OP |
| 5,080,056 | 1/1992 | Kramer et al. | 123/193 CP |
| 5,230,815 | 7/1993 | Rountree | 252/25 |
| 5,363,821 | 11/1994 | Rao et al. | 123/193.2 |

*Primary Examiner*—Ellen M. McAvoy
*Attorney, Agent, or Firm*—Joseph W. Malleck; Roger L. May

[57] ABSTRACT

A composition of matter for depositing a thin anti-friction film that has a coefficient of friction of 0.06 or less. The composition comprises (a) a mixture of solid lubricant particles, a thermoset resin, and a catalyst for setting the resin, and (b) an evaporative medium for carrying the mixture during deposition. A solid film lubricant system for protecting metal wear interfaces subject to high temperatures and wet lubrications, comprising an oil-attracting solid lubricant mixture with at least two elements selected from the group of graphite, $MoS_2$ and BN; a support for the mixture to loads of at least 10 psi at temperatures of 600°–800° F. while being thermally stable; a thermally stable thermoset polymer matrix, the polymer having inherent hydrocarbon chemical attraction to form a tenacious oil film of the lubricating oil on the wearing surface. A method of making anti-friction coated surfaces comprising providing a light metal based cylinder surface; exposing nonoxidized metal of the surface; applying a high elastic modulus load-supporting metal layer onto at least portions of the light metal cylinder surface; and simultaneously distributing a solvent-based solid film lubricant mixture and thermoset polymer onto at least portions of the layer at about room temperature to form a coating of desired thickness.

20 Claims, 12 Drawing Sheets

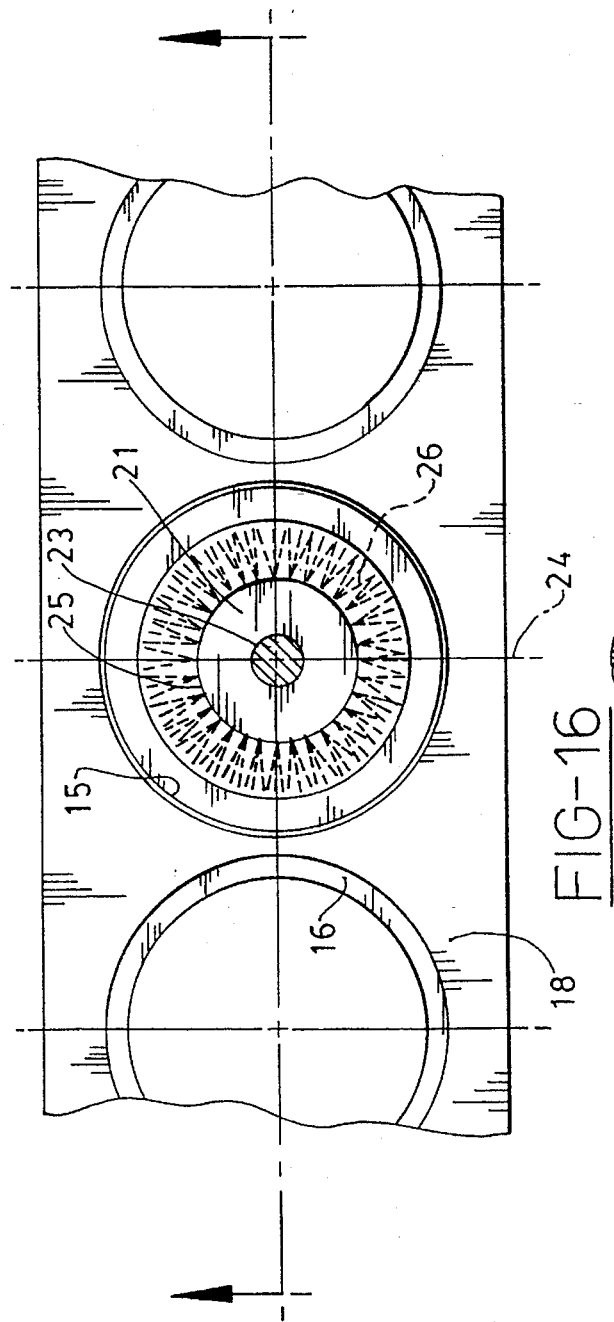
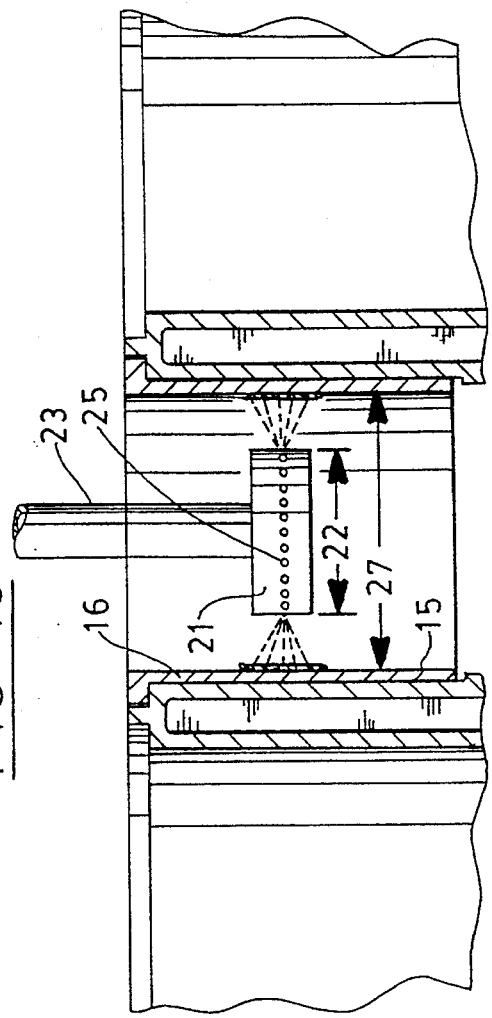
FIG-16
FIG-17

ANTI-FRICTION COATING COMPOSITION CONTAINING SOLID LUBRICANTS

RELATED APPLICATIONS

This is a continuation-in-part application of U.S. Ser. No. 08/088,686 for "Thermoset Polymer/Solid Lubricant Coating System" filed Jul. 6, 1993, now U.S. Pat. No. 5,363,821.

BACKGROUND OF THE INVENTION

1. Technical Field

This invention relates to the art of creating surface coatings that reduce friction at metal wear interfaces or contacts, and more particularly to the use of anti-friction solid film lubricants for such interfaces modified to withstand high unit scraping or bearing loads at high temperatures while functioning with either full or partial wet lubrication.

2. Discussion of the Prior Art

The utility of certain solid film lubricants for bearings has been known for some time. U.S. Pat. No. 1,654,509 (1927) discloses use of powder graphite trapped or covered by a metal binder (i.e., iron, aluminum, bronze, tin, lead, babbitt, or copper) to form a thick coating; all of the metal is heated to at least a thermoplastic condition by melting or arc spraying to bury the graphite. The coating offers limited friction reducing characteristics. Unfortunately (i) the graphite is not exposed except by significant wear of the metal, thus never realizing significantly lower friction; (ii) the metal is in a molten condition prior to trapping or burying the graphite causing thermal effects and distortions; and (iii) oxides of the metal serve as the primary lubricant.

The prior art has also appreciated the advantage of thermally spraying (by oxy-fuel) aluminum bronze as a solid film lubricant onto cylinder bore surfaces of an engine as demonstrated in U.S. Pat. No. 5,080,056. The lubricating quality of such coating at high temperatures is not satisfactory because (i) it lacks compatibility with piston ring materials which usually comprise cast iron, molybdenum coated cast iron, or electroplated hard chromium; and (iii) thermal spraying of the material by oxy-fuel is not desirable because of very high heat input necessitating elaborate tooling to rapidly dissipate heat to avoid distortion of its coated part.

One of the coauthors of this invention has previously disclosed certain solid lubricants operable at high temperatures, but designed for either interfacing with ceramics, not metals, at low load applications in the absence of any liquids, or with metals in an oilless environment. One solid lubricant disclosed comprised graphite and boron nitride in a highly viscous thermoplastic polymer binder spread in a generous volume onto a seal support comprised of nickel and chromium alloy. The formulation was designed to provide a hard coating which softens at the surface under load while at or above the operating temperature and functioning only under dry operating conditions. Thermoplastic polymer based formulations, without modification, are unsatisfactory in meeting the needs of a highly loaded engine component, such as a cylinder bore, because the interfacing surfaces are subject to wet lubrication, the unit loads are significantly higher (approaching 500 psi), and the surface temperatures are higher, causing scraping. Another solid lubricant disclosed was halide salts or $MoS_2$ (but not as a combination) in a nickel, copper, or cobalt binder; the coating, without modifications, would not be effective in providing a stable and durable anti-friction coating for the walls of an internal combustion cylinder bore, because the formulations were designed to operate under dry conditions and against ceramics (primarily lithium aluminum silicate and magnesium aluminum silicate, and, thus, the right matrix was not used nor was the right combination of solid lubricants used. Particularly significant is the fact that the formulations were designed to produce a ceramic compatible oxide (e.g., copper oxide or nickel oxide) through partial oxidation of the metal in the formulation. These systems were designed to permit as much as 300–500 microns wear. In the cylinder bore application, only 5–10 micron wear is permitted.

It is an object of this invention to provide a coating composition that economically reduces friction in high temperature environments, the composition containing solid lubricants that provide a coefficient of sliding friction of less than 0.06 when applied as a liquid, such as by atomizing spray, or as a paste for transfer pad imprinting or silk screen imprinting.

SUMMARY OF THE INVENTION

The invention, in a first aspect, is an anti-friction coating composition containing solid lubricant particles, comprising: (a) a mixture of (i) solid lubricant crystals that can provide a coefficient of friction of 0.06 or less, at least two of which are selected from the group of graphite, $MoS_2$ and BN; (ii) a thermoset resin and (iii) catalyst for setting the resin (sometimes a crosslinking agent for polymerization of the resin), and (b) an evaporative medium for carrying said mixture during deposition. The medium may be a solvent such as butyl acetate, or the medium may be a suspension carrier such as water. The resin may be bisphenol A epoxy and the ratio of medium (solvent or suspending carrier) to resin is desirably in the range of 1:5 to 2:1. The solid lubricants may further comprise 5–20% by weight of at least one selected from the group of LiF, $CaF_2$, $WS_2$, a eutectic of $LiF/CaF_2$ or $LiF/NaF_2$. The ratio of resin to solid lubricants is desirably about 3:2.

The invention, in a second aspect, is a solid film lubricant system useful in protecting a metal wear interface subject to high temperatures. The system comprises: (a) an oil-attracting solid lubricant mixture comprising at least two elements selected from the group consisting of graphite, $MoS_2$ and BN; (b) means effective to support said mixture under loads of at least 10 psi at temperatures of 600°–800° F. while being stable at such temperatures; and (c) thermoset polymer matrix adhering said mixture to the support or the wear surface, said polymer being stable at 600°–800° F. and having inherent hydrocarbon chemical attraction to form a tenacious oil film of the lubricating oil on the wearing surface.

The means for supporting the mixture may comprise (a) lands in the interface that extend above the polymer, or (b) a transition zone material or substrate between the polymer and interface that provides an elastic modulus exceeding 5 million psi, the material or substrate being comprised of ingredients selected from the group of: (i) nickel, copper, cobalt, iron, or manganese; (ii) intermetallic compounds derived from nickel, chromium, aluminum, vanadium, iron, tungsten, manganese, and molybdenum; and (iii) cast iron or steel. The system's solid lubricants preferably should have an average 2–25 micron particle size. The proportions for the selected solid lubricants preferably comprise 29–58% by weight graphite, 29–58% by weight molybdenum disulfide, and 7–16% by weight boron nitride. The thermoset polymer is preferably comprised of a thermoset epoxy resin, solvent or water-based carrier (the resin is either soluble or compatible with the carrier), a catalyst curing agent that cross-links the epoxy, and a dispersing or emulsifying agent.

Another aspect of this invention is a method of making anti-friction coated surfaces subject to sliding loads. The method comprises: (a) providing a light metal based cylinder surface (i.e., metal base or alloys of aluminum, titanium, iron or magnesium); (b) exposing nonoxidized metal of the surface; (c) applying a high elastic modulus load-supporting metal layer onto at least portions of the light metal cylinder surface; and (d) simultaneously distributing a solvent-based solid film lubricant mixture and thermoset polymer onto at least portions of the layer at about room temperature (the part may be heated to a temperature appropriate to facilitate rapid removal of the solvent to form an adherent coating) to form a coating of desired thickness. The solid lubricant mixture comprises at least two elements selected from the group consisting of graphite, $MoS_2$, and BN, and the polymer adheres the mixture to the layer upon flowing thereagainst.

The distribution step may be carried out by different species or modes, including: (i) spraying, roller transferring, or silk screening an acetate, ketone, or mineral spirit solution/emulsion containing the mixture and polymer followed by curing to provide a stable coating; (ii) spraying or roller-transferring, or brush painting or imprinting a water-based emulsion containing the mixture and the polymer, the emulsion being cured to provide a stable coating; or (iii) adhering a tape carrying the mixture and polymer which is subsequently cured. The distribution for the above method should be controlled to coat thinly, usually in the thickness range of 5–20 microns (however, the thickness can be up to 100 microns); the coating is honed, after curing, to a coating thickness of 0.001" or less, as specified. However, higher thicknesses up to 0,003" can be used when exceptional noise control is desired, or to any specified thickness under 0.010" (250 microns) in non-piston system applications and some special piston application as well. The steps (b)–(d) may be required only for that portion of the cylinder wall traversed by the sliding load or piston during a 60° crank angle of movement from top dead center as this is the range where the piston ring/cylinder bore contact pressure is highest. However, for practical purposes the entire surface may be coated.

BRIEF DESCRIPTION OF THE DRAWINGS

FIGS. 16 and 17 respectively illustrate plan and elevational sectional views of still another alternative apparatus useful for applying at room temperature the emulsion coating system;

DETAILED DESCRIPTION AND BEST MODE

Figure 1:
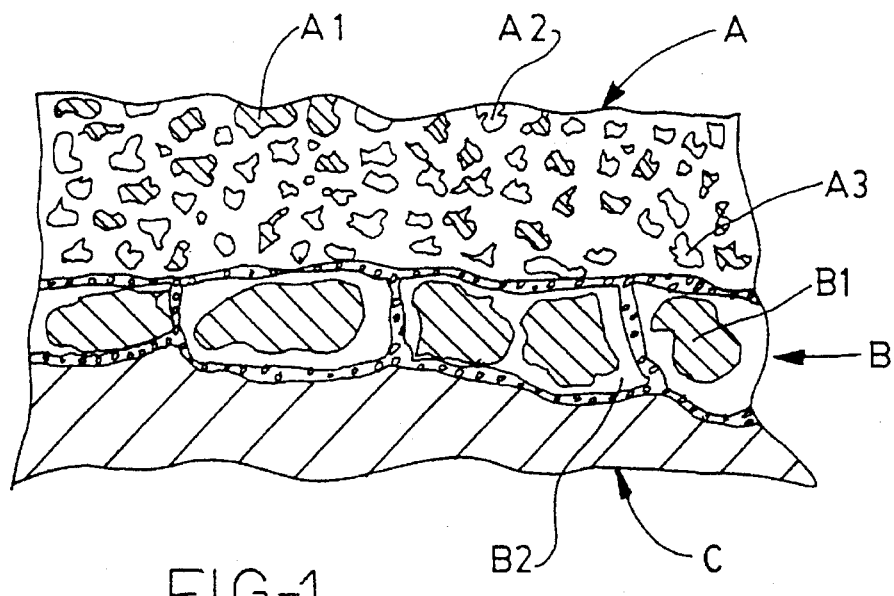
FIG. 1 is a schematic microscopic view of a fragment of one coating system of this invention.

In a first aspect, the invention is a liquid or semi-liquid composition of matter that can be readily deposited at low temperatures (i.e. room temperature to about 200° F.) in a thin film that presents an ultra low coefficient of friction, has durability at high temperatures (i.e. 400°–700° F.), and has good load bearing capabilities. The composition is comprised of (a) a mixture of solid lubricant crystals that provide a coefficient of friction of 0.06 or less, at least two of which are selected from the group consisting of graphite, $MoS_2$ and BN, a thermoset resin, a catalyst for setting the resin, and (b) an evaporative medium for carrying the mixture during deposition, the ratio of medium to mixture being in the range of 1:5 to 2:1.

The solid lubricants should desirably constitute 30–70% by weight of the evaporated deposited coating. When selected, graphite should constitute 25–58% by weight of the solid lubricants, $MoS_2$ 25–58% and BN 7–16%. The solid lubricants can also comprise 5–20% by weight of LiF, $CaF_2$, $WS_2$, a eutectic of $LiF/CaF_2$ or $LiF/NaF_2$. The thermoset resin is an organic material that has been selected to yield high molecular weight polymer and a tendency to flow on stress before being polymerized. The thermoset resin is advantageously an epoxy, such as bisphenol A, because of enhanced oil affinity properties and higher load bearing capabilities (about 6 psi), phenol formaldehyde, urea formaldehyde, melamine formaldehyde, alkyd polyester, epoxy, and vinyl butyryl; in the case of a water suspended resin, it can be benzoquanamine. The catalyst curing agent can be 2-propoxyethanol or ancamine to polymerize the resin to an infusible state. The crosslinking agent in a solvent composition can be dicyandiamide. The resin can also be a heat curing polyamide or polyamide emide (such as Torlon) where the catalyst is heat. The resin should constitute 20–60% by volume of the mixture.

The evaporative medium can be a solvent such as butyl acetate, methyl ethyl ketone, mineral spirits, butyl carbitol, diethylene glycol, cyclo hexanone, diacetone alcohol, and aromatic hydrocarbons. The medium can also be a suspending agent such as water; the water will advantageously contain a wetting and a surfactant to assure a smooth continuous bubble-free coating, when depositing the composition. The solvent should be present in a ratio of about 3:1 to the mixture if the mixture is to be air atomizod, sprayed, brushed, ink jotted, or transfer pad imprinting. If deposition technique involves silk screening or use of a photosensitive die, the mixture can be a paste (with considerably more viscosity than the sprayable liquid); the solvent or suspending medium should be in a ratio of about 1:1 to the mixture for creating the paste. It is desirable to have the suspending medium (water) in a ratio of 60:40 with the resin and in a ratio of about 60:40 to the solid lubricants.

When preparing a composition using a solvent medium, the best mode comprises a solid lubricant mixture (in weight % of the composition) of the graphite 6–16%, $MoS_2$ 9–19% and BN 3–5%. The resin is desirably an epoxy in an amount of 26–36% by weight of the composition; the catalyst is 2-propoxyethanol in an amount such as 0.5%. The crosslinking agent is dicyandiamide in an amount of about 1–3%. The solvent is diacetone alcohol (11–21%) and aromatic hydrocarbon (3–5%).

When preparing a composition using a water suspension, the best mode comprises a solid lubricant mixture (in weight % of the composition) of graphite 2–12%, $MoS_2$ 4–23% and BN 1–3%. The resin is an epoxy present in an mount of 18–28%, and benzoquanamine resin present in an amount of 2–12% . The catalyst is 2-propoxyethanol in an amount of 3–13%. The water should contain in small amounts, such as 0.5–1.0%, a wetting agent (such as made by Angus, 3M or Union Carbide), a defoaming agent, such as xanthene, and a surfactant (such as Rohm and Haas's Tamol 731).

To achieve a significant reduction in the coefficient of friction at high temperatures between normally oil-bathed metal contact surfaces, loaded to at least 10 psi, the coating system cannot rely on graphite or any one lubricant by itself, but rather upon a specific combination of solid lubricants in a special polymer that assists in replenishing graphite with water at high temperatures. As shown in FIG. 1, the inventive system comprises an outer layer A containing an oil-attracting solid lubricant mixture comprising at least two elements selected from the group consisting of graphite (A-1), $MoS_2$ (A-2), and BN (A-3); the mixture is retained in a thermoset polymer matrix (A-4) which is stable up go 600°–800° F., adheres the coating to its support, and provides hydrocarbon attraction (oil attraction). Means B is deployed to support the mixture under loads of at least 10 psi at 600°–700° F. Such means B may be an intermediate layer or coating, as shown in FIG. 1, acting as a transition zone or substrate between the layer A and the interface C. The ingredients for such intermediate layer should provide an elastic modulus exceeding 5 million psi. The ingredients are selected from the group consisting of (i) nickel, copper, iron, zinc, tin, manganese, or cobalt; (ii) intermetallic compounds derived from nickel, manganese, chromium, aluminum, vanadium, tungsten, molybdenum, iron, carbon; and (iii) cast iron or steel. As shown in FIG. 1, the intermediate layer is comprised of hard particle cores B-1 of Tribaloy containing a lave phases, the hard particles being encased in a nickel shell B-2, which shells are fused together at their outer regions as a result of plasma thermal spraying of such intermediate coating directly onto the interface. The interface is comprised of a light metal such as aluminum, titanium, or magnesium.

Figure 2:
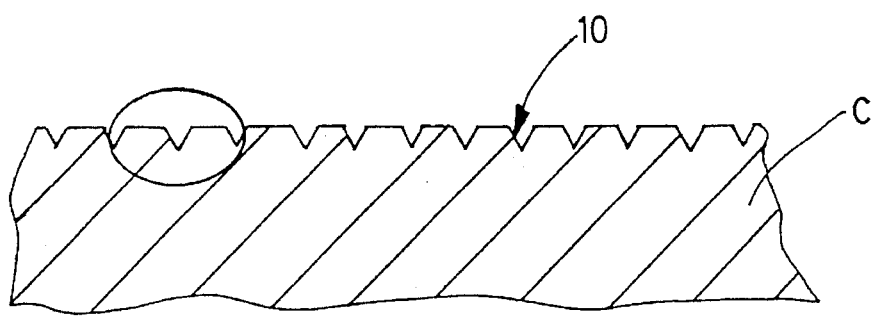
FIG. 2 is a sectional view of a portion of a cylinder bore surface that has been spiral-grooved to define lands that render a load-supporting function.
Figure 2A:
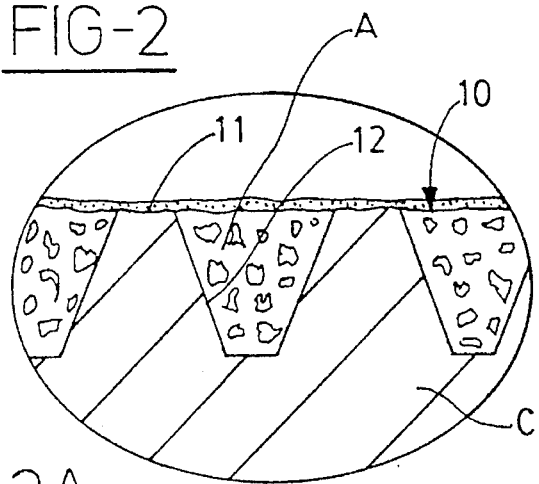
FIG. 2A is an enlarged view of a portion of FIG. 2.

Alternatively, means B may be provided by grooving 10 of the interface C (preferably spiral grooving for interior cylinder surfaces) as shown in FIG. 2. The lands 11 of the parent interface metal, created by the grooving, provide the support for loading of at least 10 psi; the layer A is coated both onto the lands 11 and within the valleys 12 of the grooves. Upon sliding contact with the opposing surface, the polymer mixture is rubbed away from the lands 11 to provide the mechanical support needed.

The interface containing the grooves can be a diffusion-type hard layer or a cast-in-surface treatment to achieve a high elastic modulus layer structure such as aluminum silicate or silicon carbide forming a particle or fiber-reinforced metal matrix composite (MMC). The layer A can then function as low shear solid film lubricant to provide low friction.

Figure 3:
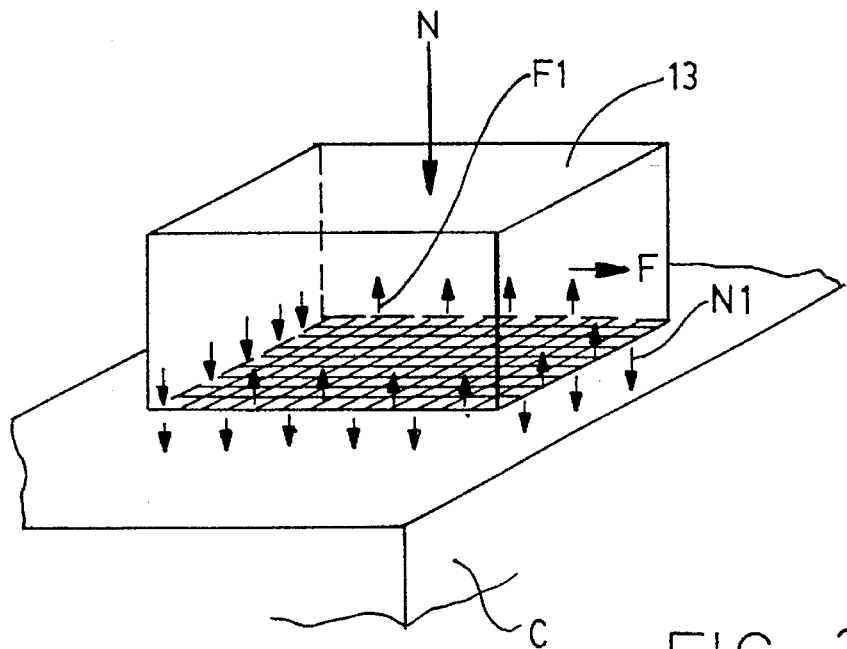
FIG. 3 is a schematic representation of the forces that influence coulomb friction.
Figure 4:
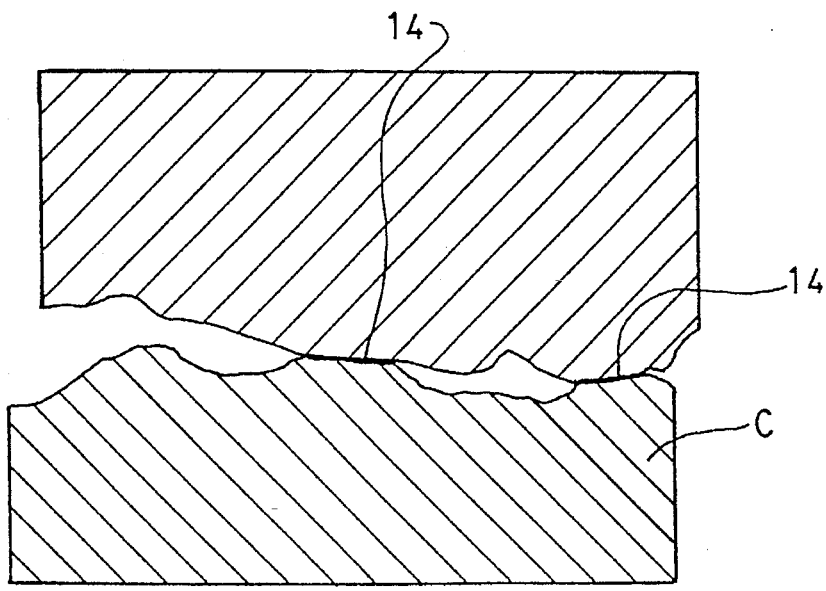
FIG. 4 is a highly enlarged microscopic view in cross-section of interfacing surfaces showing the irregularities of normal surfaces that affect coulomb friction.
Figure 5:
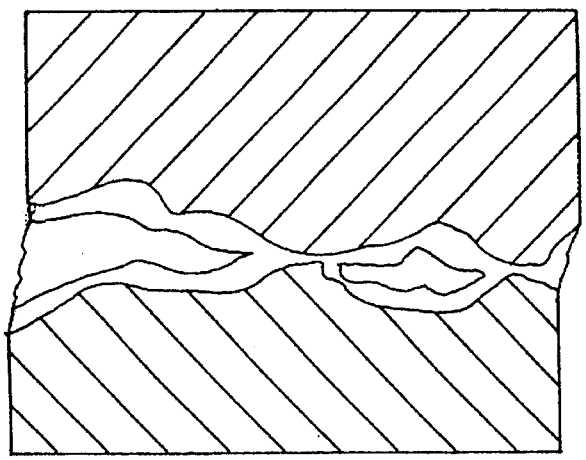
FIG. 5 is a view similar to FIG. 4 showing the incorporation of solid films on the interfacing surfaces and that affect coulomb friction.

Friction in an oil-bathed environment will be dependent partly upon fluid friction in the oil film (layers in a fluid sheared at different velocities commonly referred to as hydrodynamic friction), and, more importantly, dependent on dry or coulomb friction between contacting solid, rigid bodies (also referred to as boundary friction). Dry friction is tangential and opposed to the direction of sliding interengagement. As shown in FIG. 3, there is a visualization of the mechanical action of friction. The weight of a block 13 imposes a normal force N that is spread across several small load forces N-1 at each interengaging hump 14 (see FIG. 4). The composite of all the tangential components of the small reaction forces F-1 at each of the interengaged humps 14 is the total friction force F. The humps are the inherent irregularities or asperities in any surface on a microscopic scale. When tile interengaging surfaces are in relative motion, the contacts are more nearly along the tops of the humps and therefore the tangential reaction S forces will be smaller. When the bodies are at rest, the coefficient of friction will be greater. Friction is influenced by the attraction of the two surfaces, the deformation and tearing of surface irregularities, hardness of the interengaged surfaces, and the presence of surface films such as oxides or oils. As a result, actual friction will be different from idealized perfect contact friction, and will depend upon the ratio between shear and yield stresses of the interengaged surfaces. Thus, the presence of a film 16 on each of the interengaging surfaces 17, 18 (see FIG. 5) will serve to change the coefficient of friction depending upon the shear and yield stress capacities of the films and their relative hardness. Where the film is supported by a hump, the shear in the film will be greatest; thus, the asperities or humps facilitate lowering of friction in comparison to a perfectly flat surface with a film thereon.

Figure 6:
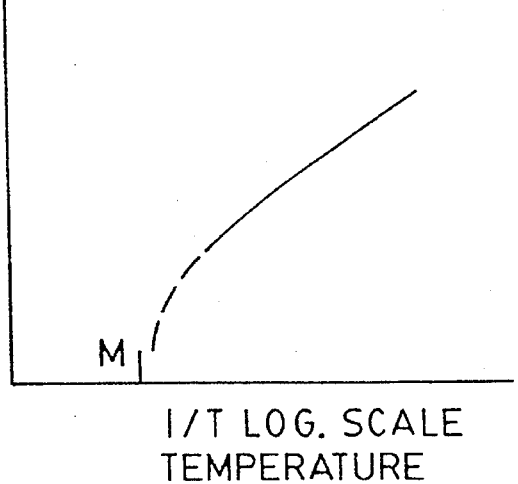
FIG. 6 is a graphical illustration of the onset of plastic flow of surface films as a function of stress and temperature.
Figure 7:
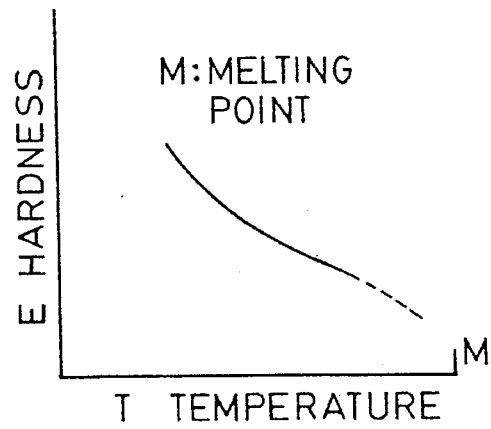
FIG. 7 is a graphical illustration of surface energy (hardness) as a function of temperature for surface films.

Friction is also influenced significantly by temperature because high local temperatures can influence adhesion at the contact points. As shown in FIG. 6, as temperature goes up, the critical stress for slip goes down, thereby increasing friction. As shown in FIG. 7, as the temperature approaches melting, the hardness (E) goes down. This is accounted for in the friction equation:

f is proportional to $1/(T_s-T)$, $T_s$ being the surface temperature and T being the bulk temperature of the sliding part.

Figure 8:
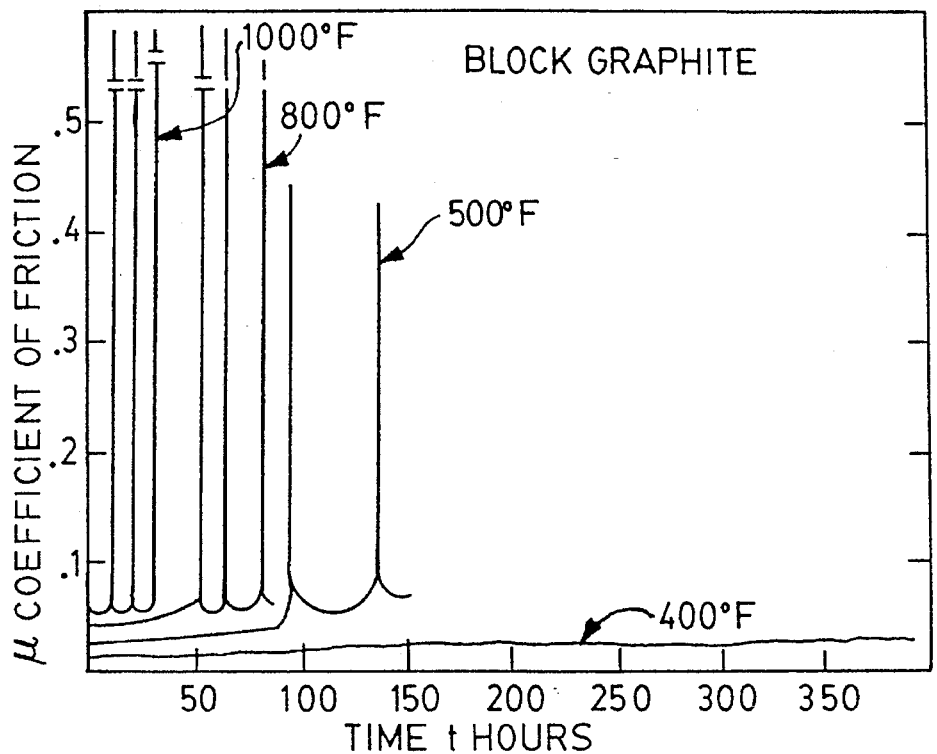
FIG. 8 is a graphical illustration of the coefficient of friction for block graphite as a function of time.
Figure 9:
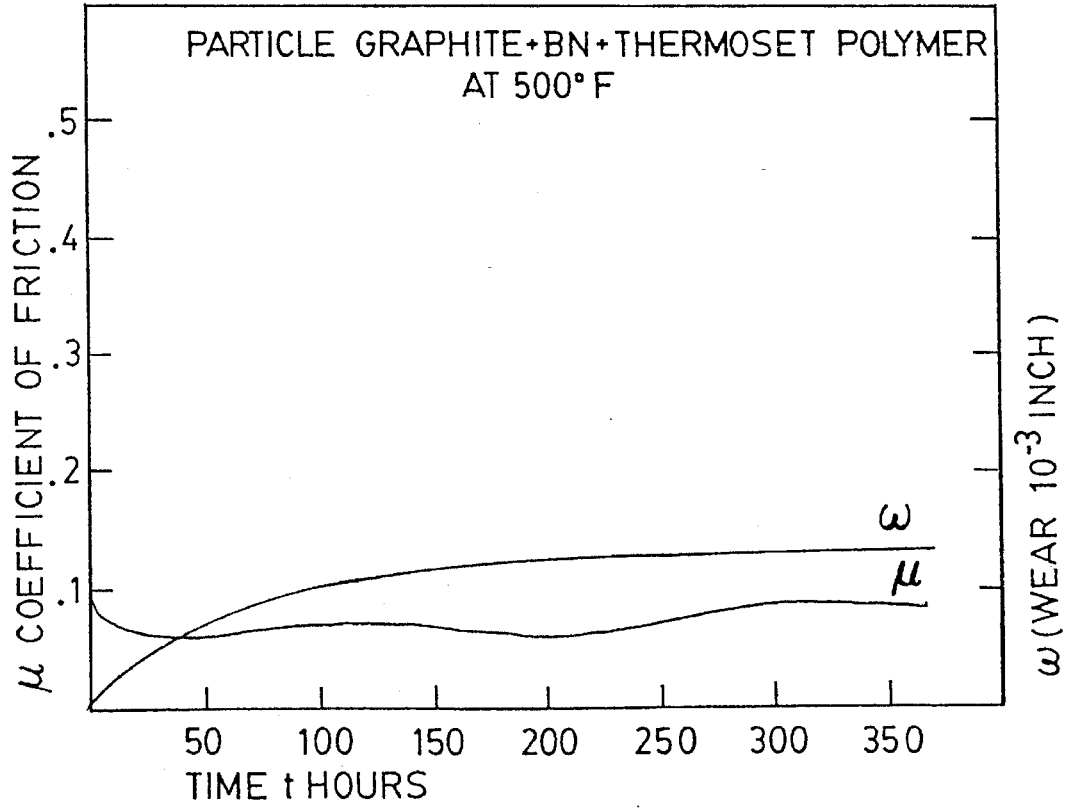
FIG. 9 is a graphical illustration of the coefficient of friction and also of wear as a function of time for the coating system of this invention tested at the temperature of 500° F.

The influence of temperature is particularly evident on block graphite, as shown in FIG. 8. The coefficient for block graphite rapidly increases to above 0.4 at 500° F. and above 0.5 at 800° F., and even higher at 1000° F. The coefficient of friction for graphite at 400° F. or lower becomes generally uniform at below 0.05. Contrast this with the coefficient of friction performance and wear performance of the coating system of this invention represented in FIG. 9. You will note that the coefficient of friction generally uniformly stays below 0.1, and wear is generally uniform at about 0.001"/ 100 hours at 500° F., in FIG. 9. The coating for FIG. 8 comprises only particle graphite, boron nitride, and a thermoset polymer.

The oil-attracting solid lubricant mixture should comprise two elements selected from the group consisting of graphite, molybdenum disulfide, and boron nitride. Graphite, when selected, should be present in an amount of 29–58% by weight of the mixture. Graphite, as earlier indicated, is effective as a solid lubricant only up to temperatures around 400° F. and possesses a very poor load bearing capability such as that experienced by a piston ring scraping against the graphite itself. Molybdenum disulfide, when selected, should be present in an amount of 29–58% by weight of the mixture, and is, most importantly, effective in increasing the load bearing capability (and also stability) of the mixture up to a temperature of at least 580° F., but will break down into molybdenum and sulfur at temperatures in excess of 580° F. in air or nonreducing atmosphere. Molybdenum disulfide reduces friction in the absence of oil or in the presence of oil, and, most importantly, supports loads of at least 10 psi at such high temperatures. Molybdenum disulfide is also an oil attractor and is very useful in this invention. Boron nitride, when selected, should be present in an amount of 7–16% by weight of the mixture and increases the stability of the mixture up to temperatures as high as 700° F. and concurrently stabilizes the temperature for the ingredients of molybdenum disulfide and graphite. Boron nitride is an effective oil attractor. Particle size of the individual ingredients may be as follows: graphite is introduced into the mixture in the range of 0.5–45 microns, molybdenum disulfide in the range of 0.3–45 microns, and boron nitride at about five microns. The mixture is typically ball-milled to produce an average particle size of 0.3–10 microns. Boron nitride is capable of supporting loads of five psi, but as part of the mixture with graphite and boron nitride in the aforementioned epoxy polymer, loads as high as 500 psi at temperatures up to 400° F. can be supported.

The optimum mixture contains all three ingredients, which will provide for a temperature stability up to temperatures as high as 700° F., load bearing capacities well above 10 psi, and excellent oil attraction capability. However, graphite/MoS$_2$ is also a worthwhile combination in that the mixture is stable up to 500° F. as an oil attractor and supports loads of at least 10 psi; graphite/BN is stable up to temperatures of 700° F., has good oil attraction characteristics, and will support loads of at least 10 psi; MoS$_2$/BN is a combination that has excellent temperature stability, oil attraction, and loading bearing capacity. The combination of all three elements will provide a coefficient of friction which is in the range of 0.07–0.08 at room temperature and a coefficient of friction as low as 0.03 at 700° F. The latter is particularly beneficial as an impregnant onto a porous substrate (such as plasma sprayed hard metals).

The system of this invention can be used not only for cylinder bore coatings, but also for engine camshafts, compressor elements, oil pumps, air conditioning equipment, transmission gears, and starter clutches, all of which experience some degree of wet lubrication. The system is most beneficial to a wet lubricated cylinder bore since it experiences reversion between oil-bathed and oil-starved conditions regularly. The oil-starved condition is experienced at engine start-up where about 35 strokes of the piston is without oil until engine reaches 1000 rpm and operating temperature.

A number of solid lubricants, which lack the characteristics needed for this invention, are as follows: Teflon, unalloyed and stress passivated nickel, copper, and iron all are oil phobic, and other solid lubricants such as PTFE (Teflon) filled coatings or PTFE itself, WS$_2$ (tungsten disulfide), are not load supporting for hydrodynamic lubrication mode nor have the necessary temperature stability at temperatures 600°–700° F. Temperature stability is important because typical engine cylinder bore wall will, at certain zones thereof and under certain engine operating conditions (such as failure of coolant or oil pump, etc.), experience temperatures as high as 700° F. even though the hottest zone of the cylinder bore surface in the combustion chamber is only 540° F.

If the means for supporting the mixture under loads of at least 10 psi at high temperatures is an underlayer or intermediate layer, such layer should have ingredients that are selected to be resistant to compressive shear and resist plastic deformation, and possess a high elastic modulus and shear stress. Ingredients effective for such intermediate layer comprise alloys of iron, aluminum, nickel, vanadium, tungsten, manganese, molybdenum, and chromium, which contain extremely hard intermetallic particles such as lave phases (such as in Tribaloy). The ingredients of such underlayer should have an elastic modulus exceeding 5 million psi. Nickel alloys have an elastic modulus of 27 million psi, silicon carbide of 60 million psi, tool steel of 29 million psi, cast iron of 17 million psi, nickel oxide of 24 million psi, and Tribaloy of 30 million psi.

The thermoset polymer is preferably comprised of a thermoset epoxy, such as bisphenol A, present in an amount of 25–40% of the polymer, such epoxy being of the type that cross-links and provides hydrocarbon and water vapor transfer to graphite while attracting oil. The polymer also should contain a curing agent present in an amount of 2–5% of the polymer such as dicyanidimide; the polymer may also contain a dispersing agent present in amount of 0.3–1.5% such as 2, 4, 6 tri dimethylamino ethyl phenol. The carrier for such polymer may be mineral spirits or butyl acetate.

Both Tribaloy, stainless steels such as iron-manganese-chromium or iron-nickel-chromium alloys, nickel-chromium and aluminum alloys, and the thermoset polymer have a very important characteristic in that they are not affected by formic acid which is formed when an engine is fueled with flex fuel, such as containing methanol.

An extremely important and new feature of the inventive solid lubricant system herein is a lower coefficient of friction at higher temperatures and while in the environment of an oil-bathed interfacing contact, and provides lubrication and protection against scuffing even when oil fails and oil film is lost. Under these severe conditions, conventional surfaces rubbed by cast iron or steel piston rings show rapidly increasing friction and experience scuffing failures in only a few seconds. However, with the solid film lubricant herein, coating scuffing does not occur even after long periods of exposure to severe thermal environments. The coefficient of friction for such system at 750° F. is in the range of 0.02–0.06. In addition, this coating has excellent noise attenuation characteristics which reduce the piston noise significantly while providing improved gas blow-by during engine operation, particularly in case of aluminum engine blocks.

Process of Making

Figure 10:
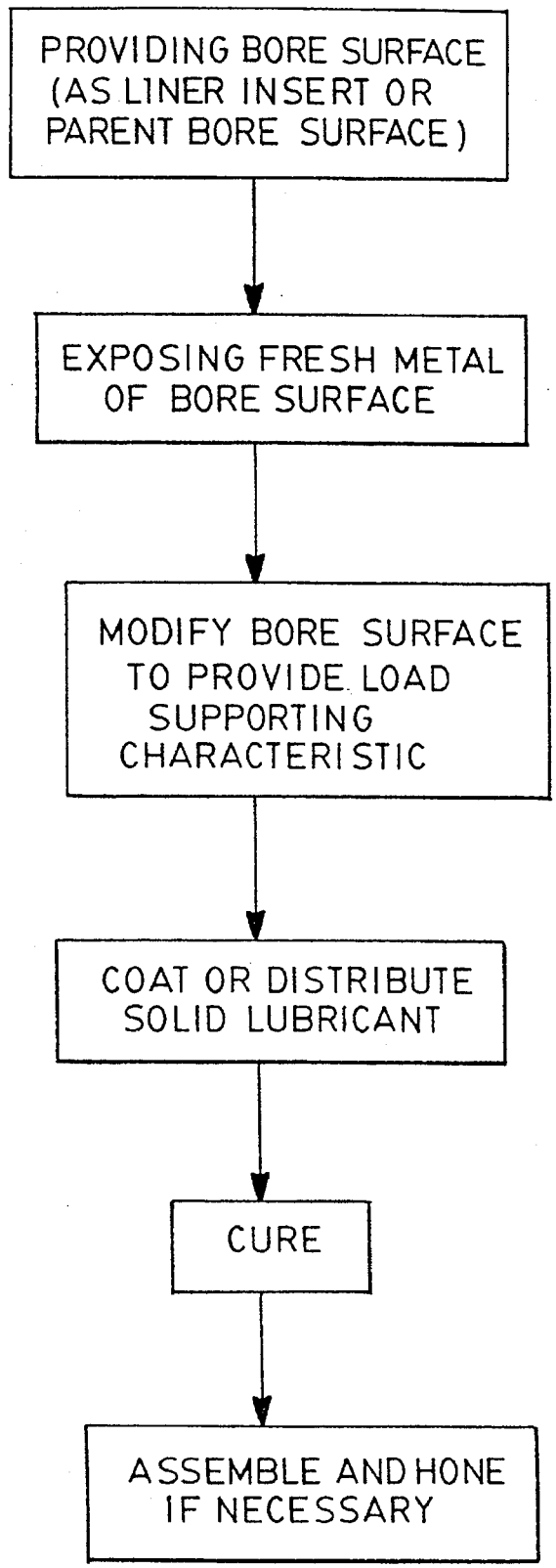
FIG. 10 is a block diagram showing schematically the steps involved in the method of making the coated components of this invention.
Figure 11:
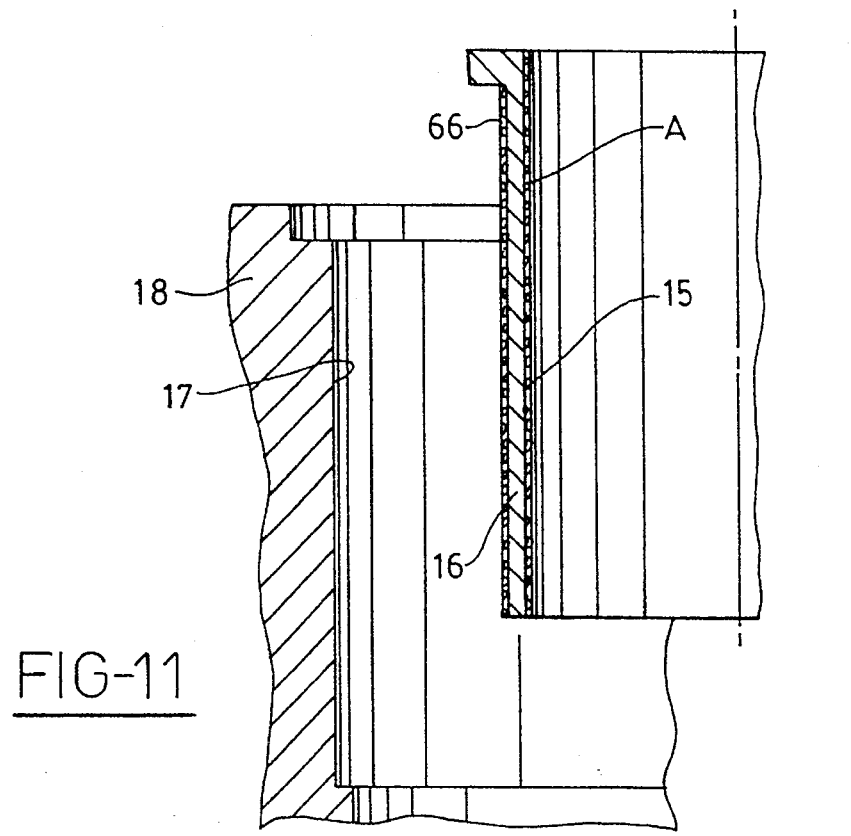
FIG. 11 is an enlarged sectional view of a portion of the liner in position for being installed in a cylinder block bore.

As shown in FIG. 10, the comprehensive method steps for making coated cylinder bore walls comprise: (a) providing a light metal bore surface 15 either as part of a liner insert 16 or as part of the parent bore 17; (b) exposing fresh metal of the bore surface 15 for coating; (c) modifying the bore surface 15 to support loads of at least 10 psi; (d) coating a solid lubricant mixture and polymer matrix A onto the modified surface; (e) curing the matrix; and (f) assemble the liner insert 16 to the cylinder block parent bore 17, if used. It is preferred to coat the parent bore surface 17 of a cylinder block 18 directly to reduce the steps needed to prepare the block 18. If a liner insert is used, it is adapted for a shrinkfit within the receiving cavity or bore 17 of the cylinder block as shown in FIG. 11. The liner insert may be coated independently of the block for ease of manipulation and ease of access to the interior of the liner. The liner would be constituted of the same or similar material as that of the parent bore 17; a light metal alloy, selected from the group of aluminum, magnesium, and titanium, is used for the bore surface. However, the liner can be any metal that has a higher strength as the metal of the parent bore wall; this is often achieved by making an alloy of the metal used for the parent bore wall. For example, C-355 or C-356 aluminum alloys for the liner are stronger than the 319 aluminum alloy commonly used for aluminum engine blocks. The liner must have, generally, thermal conductivity and thermal expansion characteristics essentially the same as the block. The manner of assembling the liner to the block is described later, such as by use of a thermal bonding layer 19 of flake copper in an epoxy matrix. The liner may also be cast-in-place while casting the bore wall.

Exposing fresh metal of the bore surface 15 may comprise wire brushing (using a hardened stainless steel wire diameter of about 0.004 inches) to produce approximately 130–150 micro-inch surface finish without any significant metal removal. This step can be avoided by rough-machining the bore surface (to 130–150 micro-inch or coarser surface roughness, if desired) and then degreasing and applying the coating. The surface is prepared by degreasing with OSHA approved solvent, such as ethylene dichloride, followed by rinsing with isopropyl alcohol. The surface is grit blasted with clean grit. Alternately, the surface can be cleaned by etching with dilute HF acid followed by dilute $HNO_3$ and then washed and rinsed. Wire brushing also helps to move the metal around without burnishing. The bristles of the wire brush should have a hardness of at least Rc 45, preferably about Rc 55. It is sometimes desirable to additionally etch the brushed surface with $HNO_3$ or HF acid diluted in water or alcohol. The wire brushing and etching exposes elemental metal that facilitates adherence of the coating A thereto.

Figure 12:
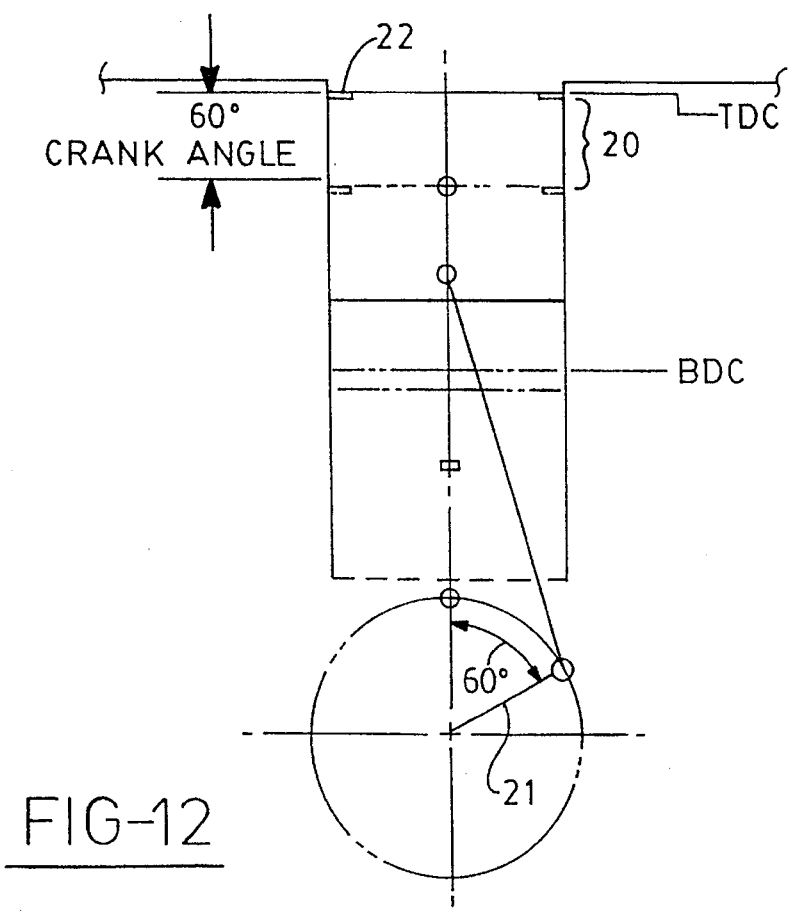
FIG. 12 is a schematic illustration of the mechanics involved in reciprocating a piston within a cylinder bore showing the travel of the piston rings which promote a loading on the cylinder bore coating system.

It is, in most cases, necessary to prepare a coatable surface 15 that is a segment 20 of the entire bore surface 17 or liner insert 16. Such segment 20 would be the area for depositing the underlayer or coating 13 which is a load supporting modification. As shown in FIG. 12, the location of conventional sliding piston rings 22 moves linearly along the bore wall a distance 20. Such interfacing locus of the piston rings is moved by the crank arm 21 during an angle representing about 60° of crank movement. This distance is about ⅓ of the full linear movement of the piston rings (between top dead center (TDC) and bottom dead center (BDC)). The distance 20 represents the hottest zone of the bore wall where variably lubricated contact and high contact pressure is most susceptible to drag and piston slap and which is the source of a significant portion of engine friction losses. Such contact in such zone causes scuffing of the bore wall in case of partial or full failure of liquid lubricant.

Figure 13:
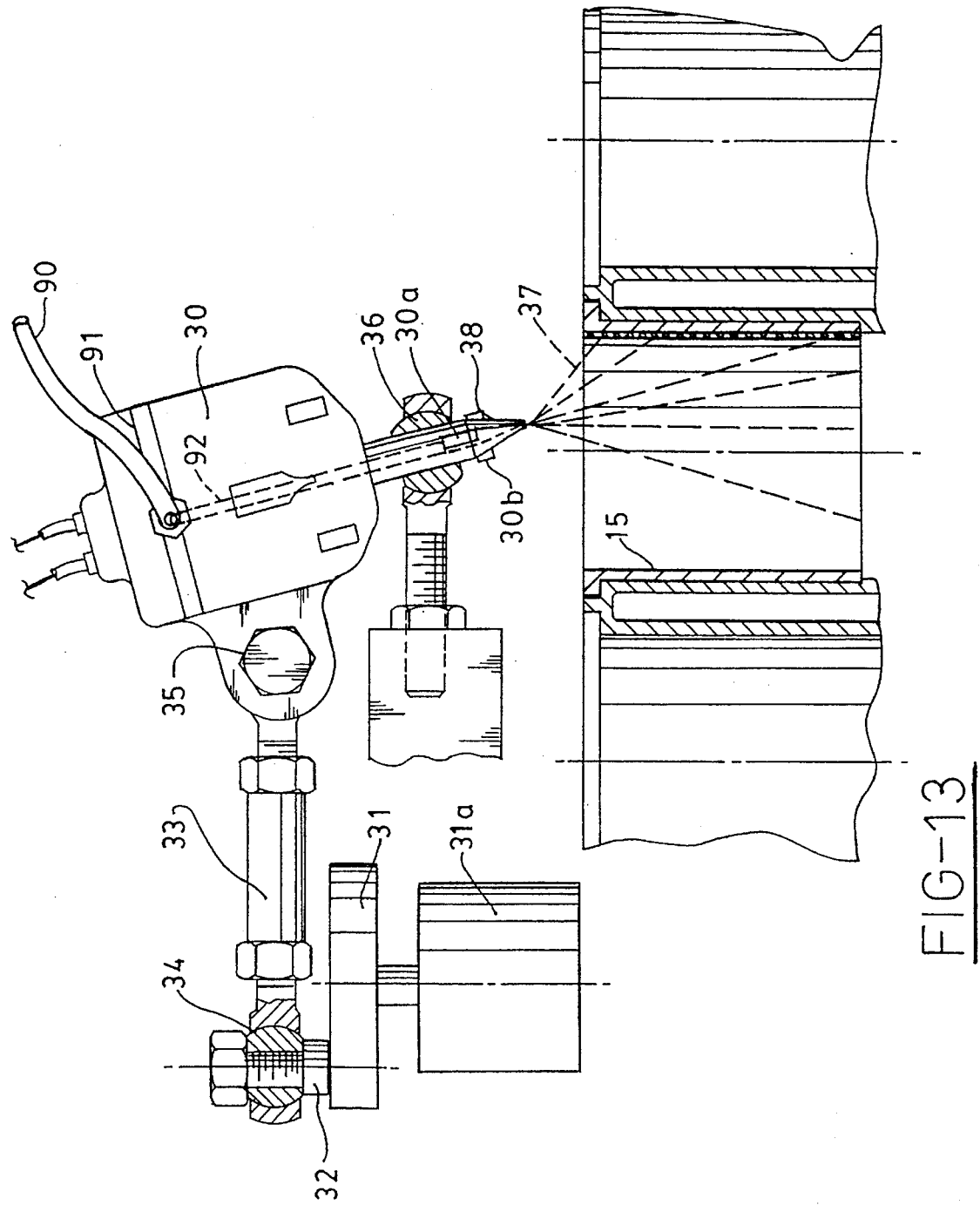
FIG. 13 is a view of the coating or distributing apparatus for depositing at high temperatures a plasma metallic-based coating on a cylinder bore shown in cross-section.

The bore surface may be modified for supporting loads preferably by plasma spraying of a hard metallized support coating B, as shown in FIG. 1. The plasma spraying may be carried out by equipment, as illustrated in FIG. 13, using a spray gun 30 having a pair of interior electrodes 30a and 30b that create an arc through which powdered metal and inert gas are introduced to form a plasma. The powder metal may be introduced through a supply line 90 connected to a slip ring 91 that in turn connects to a powder channel 92 that delivers to the nozzle 38. The plasma heats the powder, being carried therewith, along only the outer shell of the powder grains. The gun is carried on an articulating arm 33 which is moved by a journal 34 carried on an eccentric positioner 32 carried on a rotating disc 31 driven by motor 31a. The nozzle 38 of the gun is entrained in a fixed swivel journal 36 so that the spray pattern 37 is moved both annularly as well as linearly up and down the bore surface 15 as a result of the articulating motion of the gun. The nozzle may also be designed to extend deep into the bore to establish a spray pattern.

The powder used for the plasma spray has a metal or metal alloy selected from the group, previously mentioned, of: (i) nickel, copper, iron, or cobalt; (ii) intermetallic compounds derived from nickel, chromium, aluminum, vanadium, iron, manganese, etc., particularly Tribaloy, containing extremely hard lave phases or containing silicon carbide particles; and (iii) cast iron or steel, particularly stainless steels or iron-chrome-nickel or iron-chrome-manganese-nickel steel types. The powder preferably contains particles of the hard phase B-1 entrained within a shell B-2 of a softer adherent metal such as nickel, cobalt, or copper. The particle size is desirably in the range of 35–60 microns. Grains of 30–55 microns are freely flowable, which is necessary for feeding a plasma gun. If less than 30 microns, the powder will not flow freely. If greater than 55–60 microns, stratification will occur in the coating lacking uniform commingling of the particles. This does not mean that particle sizes outside such range must be scraped for an economic loss; rather, the finer particles can be agglomerated with wax to the desired size and oversized particles can be ball-milled to the desired size. Thus, all powder grains can be used. The parameters of plasma spraying should preferably be as follows: 10–40 KW of power for conventional plasma spray equipment, and a powder flow velocity of 5–25 lbs/hr with a gas aspirated powder induction system.

Alternatively, the load supporting modification may be carried out by spiral grooving of the parent bore surface as shown in FIG. 2, previously described. The shape of each groove should be essentially a double helix, having a width of about 10–150 microns, spacing therebetween of 10–150 microns, and a depth of approximately the maximum width.

Another version of the support layer could have the hard metal powders, described above, mixed with solid film lubricants described earlier, namely, $MoS_2$, graphite, and BN, both encapsulated in nickel or cobalt shells. In cases where nickel encapsulates the solid film lubricant, iron or ferro chrome or ferro manganese may be introduced to produce a very hard matrix deposit due to interaction with nickel in the hot plasma flame. This is a very desirable condition for reduced wear without an increase in friction. In such cases, only a very thin upper solid film lubricant coating (A) is needed.

The distribution step applies the solid lubricant mixture to the modified surface. The coating mixture should have the chemistry previously disclosed as comprising a thermoset polymer and solid film lubricant. Such mixture is applied at room temperature as an emulsion using extremely fine particle size (such as −325 mesh) solid lubricants. An extremely fine particle size is important because it contributes to proper wear of the coating as it shapes itself during piston use and advantageously suspends the very fine worn particles in the engine oil system adding to the reduction of the coefficient of friction throughout the entire engine where the oil is applied.

There are three major modes of distribution disclosed by this invention, including spraying, roller transfer, and tape pasting.

Figure 14:
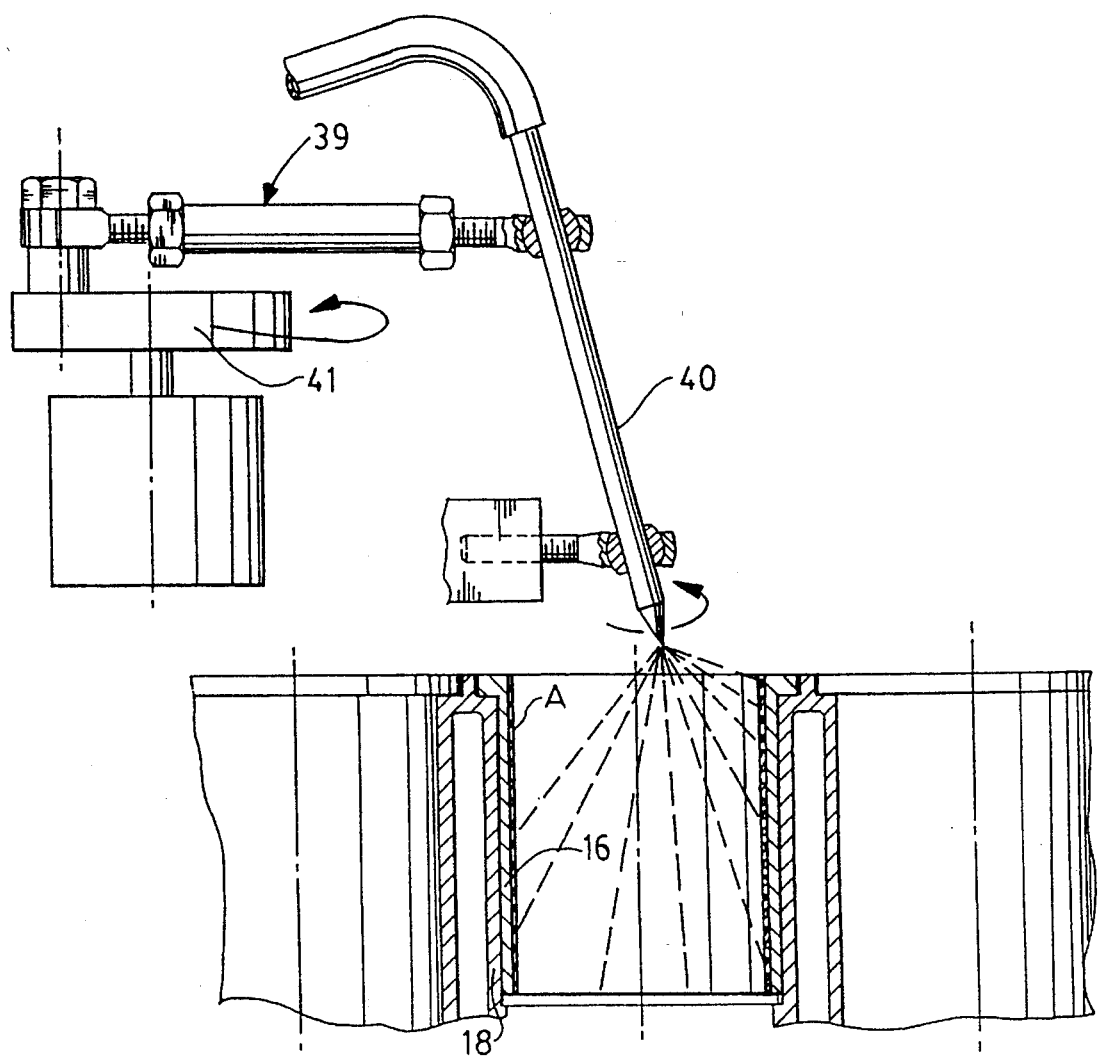
FIG. 14 is a view of an articulating apparatus used to spray at room temperature the emulsion forming part of the coating system of this invention.

Emulsion spraying is advantageous because it is fast and easily reprogrammable. The solvent for the emulsion of particles can be water-based or mineral spirits. The viscosity of the emulsion must be controlled to about 450 cpu to facilitate such spraying. As shown in FIG. 14, spraying may be carried out by an articulating spray nozzle 40 held in articulating apparatus 39 similar to that shown in FIG. 13. The spray nozzle 40 has its upper end moved in a circular horizontal linear pattern, as a result of the eccentric rotation of the disc 41, and its lower end is maintained in a relatively fixed position but permitting swiveling. This results in a sprayed coating A which can cover extensive portions of the cylinder bore wall or can be restricted to a short segment of the bore wall.

Figure 15:
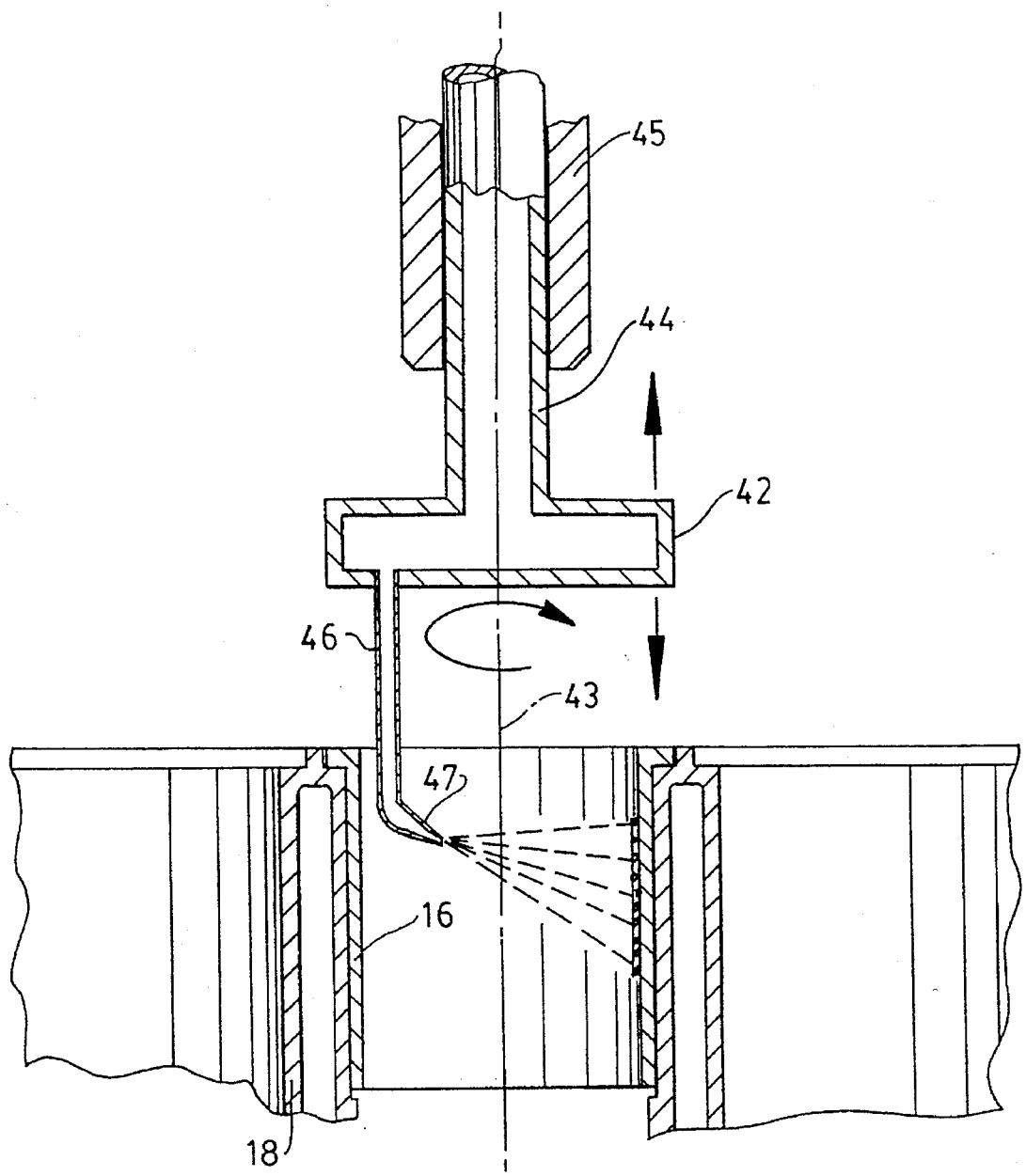
FIG. 15 is an alternative apparatus useful in applying at room temperature the emulsion mixture of this invention.

An alternative apparatus for spraying is shown in FIG. 15, which rotates an emulsion chamber 42 about the axis 43 of the bore surface 15 by use of a chamber arm 44 journalled in a sleeve 45. The chamber 42 has a spray arm 46 depending from an eccentric position of the chamber, and has a nozzle 47 which is canted (at an angle of about 60° to arm 46) so that, upon rotation of the chamber 42, the nozzle 47 sprays across the diameter of the interior of the cylinder bore 15 so as to coat more directly a limited segment of the bore wall.

Another mode for spraying the emulsified solid lubricant mixture is shown in FIGS. 16 and 17. An annular chamber 21 of a diameter 22, significantly smaller than the diameter 27 of the cylinder bore 15, is carried on a feed column 23 which is raised and lowered along the axis 24 of the cylinder bore. The chamber 21 has a series, or at least one horizontal row, of surrounding spray outlets 25 which form nozzles for emitting the emulsion contained within the chamber; this provides a complete annular spray pattern 26 that coats the entire interior periphery of the cylinder bore simultaneously. This achieves a uniform coating with greater rapidity.

Figure 19:
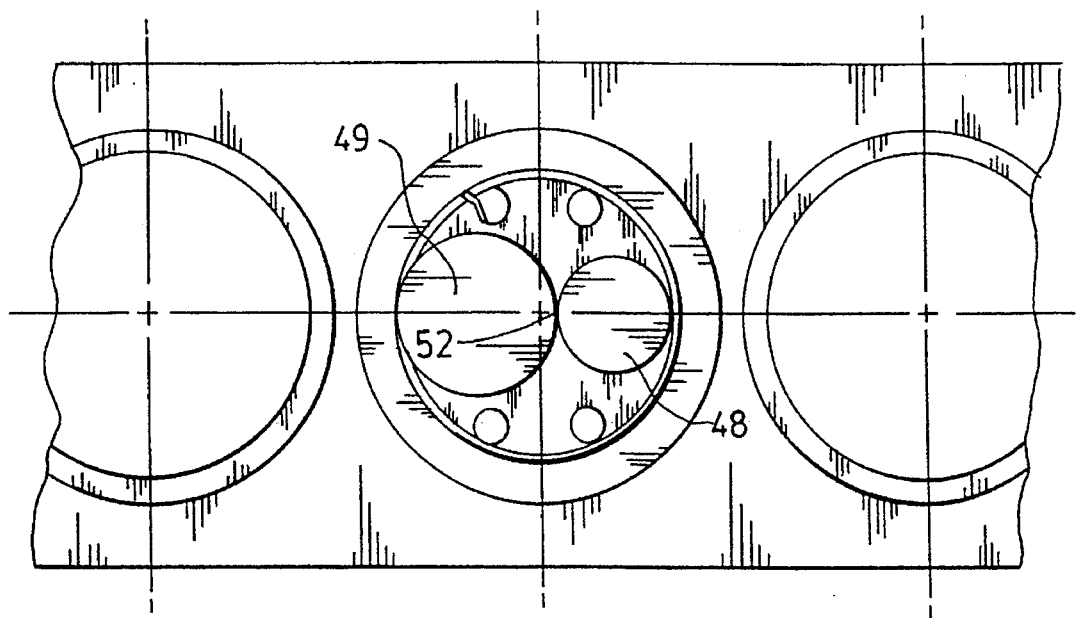
FIGS. 18 and 19 are respectively plan and elevational sectional views of a roller or imprinting device for transferring the emulsion coating system of this invention to the cylinder bore at room temperature.
Figure 18:
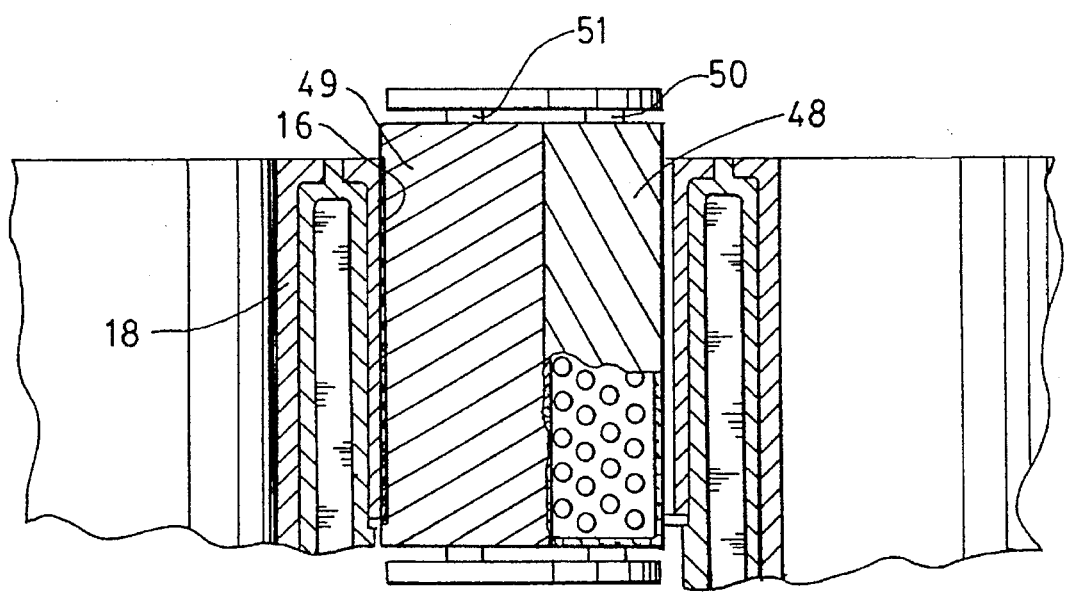
Figure 20:
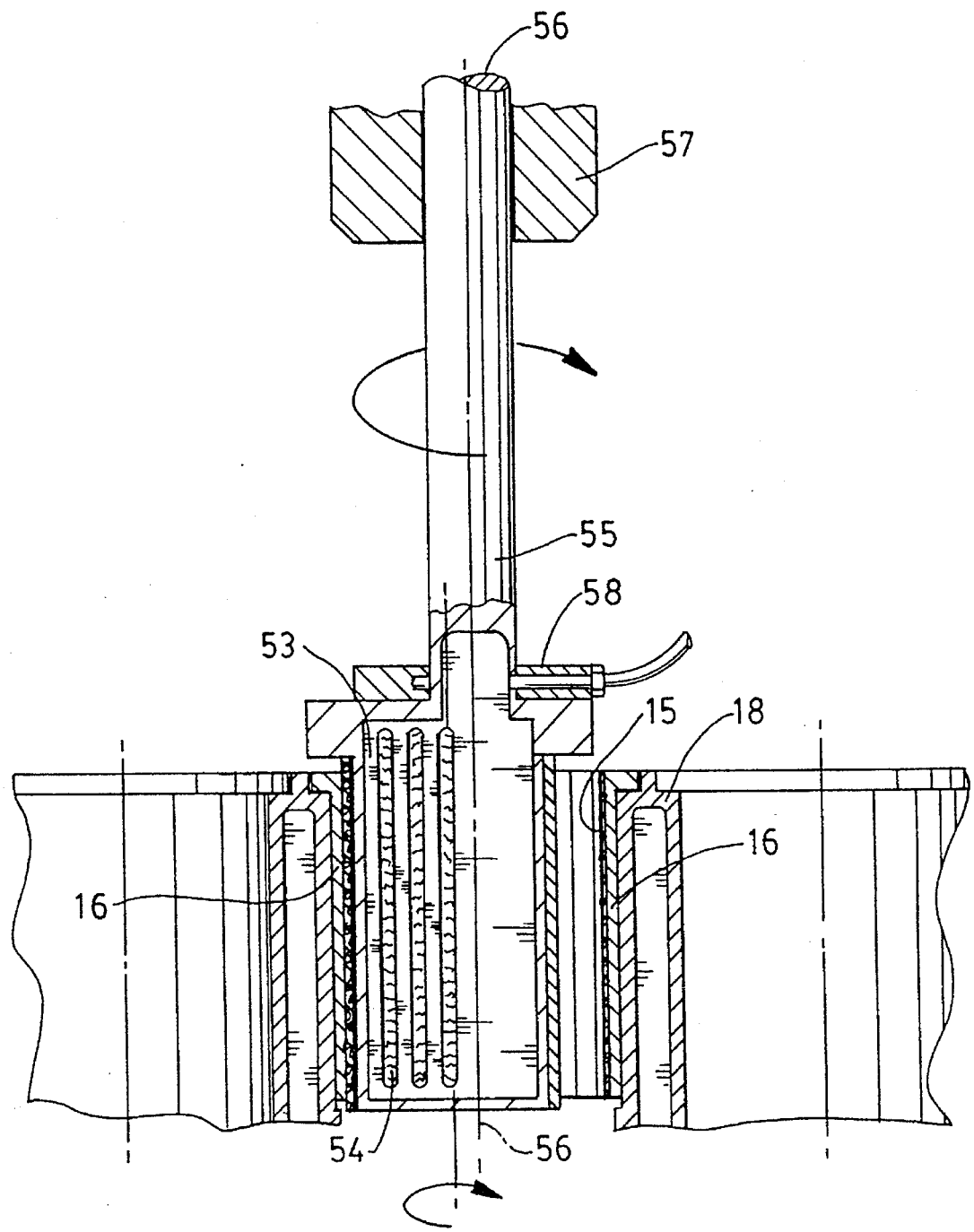
FIG. 20 is yet still another alternative embodiment for a roller or imprint device useful in transferring the emulsion coating system to the cylinder bore surface.

The second major mode of distribution is that as shown in FIGS. 18 and 19, wherein the emulsion is painted either by brush or by a roller transfer mechanism. A foraminous roller 48 containing a supply of the emulsion is brought tangentially into contact with an applicator roller 49. The applicator roller 49 contains an absorbent covering that, when pressed against the interior of the cylinder wall, imprints the emulsion onto such surface. The foraminous roller and applicator roller are maintained on respective journals 50 and 51 which allow for their rotation along an axis parallel to the axis 52 of the cylinder while in respective tangential contacts with each other and with the cylinder wall, as described. Thus, when the applicator roller 49 is tangentially pressed against the cylinder bore wall 15 of the liner insert 16, and caused to rotate about its journal 51, this in turn causes the foraminous roller to turn therewith constantly feeding new emulsion, contained as a reservoir within 48, to the absorbent coating of the imprinting applicator roller. Alternatively, as shown in FIG. 20, the imprinting equipment may comprise a single drum 53 carrying axially aligned absorbent ribs 54 which permit transfer of the emulsion contained interiorly within the drum 53 to the cylinder bore surface 15 of insert 16 and it is tangentially rolled in contact therewith. The drum is carried by a leg 55 connected eccentrically to the drum; the leg rotates about the axis 56 of the cylinder wall within a journal 57. The leg is fed with emulsion by a slip connection at 58.

The third major mode of emulsion application is by way of a coated tape 60. The tape may have a supporting paper 61 impregnated with silicone 62. The solid film lubricant mixture and polymer coating A is applied to such siliconizod paper prior to placing on the bore surface 15 and is also partially cured prior to implanting the tape. The thickness of the coating A is carefully controlled to be uniform, thereby eliminating post application grinding. Such partial curing should be at a temperature of about 215° F. for about 15 minutes. If the solvent for the polymer of coating A is mineral spirits or acetate, then the curing should be at 250° F. for the same period of time. The coated siliconizod tape is placed in a precise position on the interior of the bore, such as by robotic implantation, with the coating A facing the bore wall, as shown in FIG. 21a. The coating is then fully cured by heating to 150° F. for 15–30 minutes. To facilitate adhesion to the bore surface, the bore surface is bathed in the conventional solvent such as methyl ethyl keytone or butyl acetate; when the tape is pressed on the bore wall 15, the solvent layer interacts with the epoxy thermoset polymer and bonds to the bore surface. The siliconized paper is then peeled off. Only the final curing is carried out with the tape in place at a temperature of about 100°–150° F. for 15–30 minutes. Alternatively, (i) the same formulation with a much lower viscosity is brushed on the bore surface and then the emulsion carrying tape is pressed onto such surface followed by curing, or (ii) an appropriate microwave or electrocure may be carried out for only a few seconds in place of thermal curing.

The assembly step is necessary when a liner is used such as shown for FIGS. 13–21. The liner 16 can be either frozen to about a temperature of −40° F. while maintaining the block at room temperature, or the block itself may be heated to about 270° F. while the liner is retained at room temperature. In either case, a shrink-fit is obtained by placing the liner in such differential temperature condition within the block. Preferably, the liner is coated on its exterior surface with a copper flake epoxy mixture 66 (see FIG. 11), the epoxy being of the type similarly described previously for use in coating A.

The copper flake within such thermoset epoxy coating assures not only an extremely solid bond between the liner and the light metal parent bore but also increases the thermal transfer therebetween on a microscopic scale. The copper content of the coating 66 may be about 70–90% by weight. Such layer will act as a noise attenuator.

The deposited thickness of the coating A should be about 20–140 microns. The action of piston rings on such coating during start-up will self-polish or glaze such coating with minimum wear of less than 5–10 microns while automatically creating zero clearance if the piston rings have controlled unit loads.

We claim:

1. An anti-friction coating composition depositable in a thin film, comprising:

(a) a mixture of (i) solid lubricant crystals that provide a coefficient of friction of 0.06 or less, at least two of which are selected from the group consisting of graphite, $MoS_2$ and BN; (ii) a thermoset resin; and (iii) a catalyst for setting resin; and (b) an evaporative medium for carrying said mixture during deposition, the ratio of medium to mixture being in the range of 1:5 to 2:1.

2. The composition as in claim 1 in which said solid lubricants further comprise 5–20% of at least one selected from the group of LiF, CaF$_2$, WS$_2$, a eutectic of LiF/CaF$_2$ or LiF/NaF$_2$.

3. The composition as in claim 1 in which graphite, when present, constitutes 25–58% by weight of the solid lubricants, MoS$_2$ when present 25–58%, and BN when present 7–16%, and said solid lubricants comprising 30–70% by weight of the deposited coating with the remainder being the polymerizable resin.

4. The comoosition as in claim 1 in which said medium is a solvent that dissolves the resin.

5. The composition as in claim 1 in which said medium is water that suspends that said solid lubricant particles and resin.

6. The composition as in claim 1 in which said medium is present in a ratio of about 3:1 to said mixture to create an air atomizing sprayable liquid, and in a ratio of about 1:1 to create a paste.

7. An anti-friction coating composition depositable in a thin film, comprising:
   (a) a mixture of (i) solid lubricant crystals that provide a coefficient of friction of 0.06 or less, at least two of which are selected from the group consisting of graphite, MoS$_2$ and BN; (ii) a thermoset resin that polymerizes to an infusible state; and (iii) a catalyst and a crosslinking agent for polymerization of the resin; and
   (b) an evaporative medium for carrying said mixture during deposition, the ratio of the medium to resin being in the range of 1:5 to 3:1.

8. The composition as in claim 7 in which said solid lubricants comprise a mixture in weight % of the composition, graphite 6–16% MoS$_2$ 9–19% and BN 3–5%.

9. The composition as in claim 1 in which said resin is selected from the group consisting of bisphenol A having enhanced oil affinity property and enhanced load bearing capability, phenol formadehyde, urea formaldehyde, melamine formaldehyde, alkyd polyester, vinyl butyryl, and epoxy.

10. The composition as in claim 8 in which said catalyst is 2-propoxyethanol and said crosslinking agent is dicyaniamide.

11. The composition as in claim 8 in which said solvent is selected from the group consisting of butyl acetate, methyl ethyl ketone, butyl carbitol, diethylene, glycol cyclo hexamone, diacetone alcohol, and aromatic hydrocarbons.

12. The composition as in claim 1 in which said catalyst is ancamine and the crosslinking agent is dicyandiamide.

13. An anti-friction coating composition depositable in a thin film, comprising:
   a) a mixture of (i) solid lubricant crystals that provide a coefficient of 0.04 or less, (ii) a thermoset resin, and (iii) a catalyst for setting the resin; and
   (b) water mediums for carrying said mixture in suspension during deposition.

14. The composition as in claim 13 in which said thermoset resin is epoxy resin, present in an amount of about 18–28% by weight of the composition, and benzoquanamine, present in an amount of 2–12% by weight of the composition.

15. The composition as in claim 13 in which said catalyst is 2-propoxyethanol, present in an amount of 3–13% by weight of the composition.

16. The composition as in claim 13 in which said solid lubricants are at least two selected from the group of graphite, MoS$_2$ and BN.

17. The composition as in claim 13 in which said solid lubricants comprise a mixture of graphite present in 4–23%, and BN present in an amount of about 1–3.

18. The composition as in claim 13 in which said water medium additionally contains an effective amount of wetting agent, defoamer, and surfactant to promote a smooth continuous bubble free deposition of the composition onto metal.

19. The composition as in claim 13 in which said medium to mixture ratio is in the range of 1:1 to 1:2.

20. An anti-friction coating composition depositable in a thin film, comprising:
   (a) a mixture of
      (i) solid lubricant crystals that provide a coefficient of friction of 0.06 or less; and
      (ii) thermoset resin with polymerizing agents that is polymerizable to an infusible state; and
   (b) an evaporative medium for carrying said mixture during deposition.

* * * * *